United States Patent [19]

Nishino et al.

[11] Patent Number: 4,885,020
[45] Date of Patent: Dec. 5, 1989

[54] METHOD OF MANUFACTURING GLASS FIBER

[75] Inventors: Atsushi Nishino; Yasuo Mizuno; Masaki Ikeda, all of Osaka, Japan

[73] Assignee: Matsushita Electric Industrial Co., Ltd., Osaka, Japan

[21] Appl. No.: 152,202

[22] Filed: Feb. 4, 1988

[30] Foreign Application Priority Data

Feb. 5, 1987 [JP] Japan .................................. 62-25118
Feb. 5, 1987 [JP] Japan .................................. 62-25120

[51] Int. Cl.$^4$ ............................................. C03B 37/00
[52] U.S. Cl. ............................................. 65/2; 65/13; 65/122
[58] Field of Search .................. 65/2, 4.3, 13, 42, 122; 501/35, 74, 75, 76; 249/117, 160

[56] References Cited

U.S. PATENT DOCUMENTS

| | | | |
|---|---|---|---|
| 974,133 | 11/1910 | Gathman | 249/160 |
| 2,980,957 | 4/1961 | Hicks | 65/2 |
| 2,992,516 | 7/1961 | Norton | 65/42 X |
| 3,236,617 | 2/1966 | Jamnik et al. | 65/42 X |
| 3,425,454 | 2/1969 | Eakins et al. | 65/2 X |
| 3,582,305 | 6/1971 | Dunlap et al. | 65/13 X |
| 3,819,348 | 6/1974 | Murray | 65/42 X |
| 4,435,511 | 3/1984 | Weaver | 501/76 X |
| 4,568,651 | 2/1986 | Sagara | 501/75 |
| 4,618,538 | 10/1986 | Emonts et al. | 501/76 X |

Primary Examiner—Robert L. Lindsay
Attorney, Agent, or Firm—Lowe, Price, LeBlanc, Becker & Shur

[57] ABSTRACT

A method of manufacturing a polygonal glass fiber is disclosed. According to an embodiment of the present invention, a glass in a melted state is poured into a dividable polygonal slit having a cross section 5 to 20 times larger than a finally required cross section of a glass fiber to be made, and the glass poured into the slit is drawn so as to make a polygonal glass fiber. According to another embodiment of the present invention, a glass in a melted state is passed through a twin roller having a required cross section so as to make a polygonal glass fiber.

10 Claims, 5 Drawing Sheets

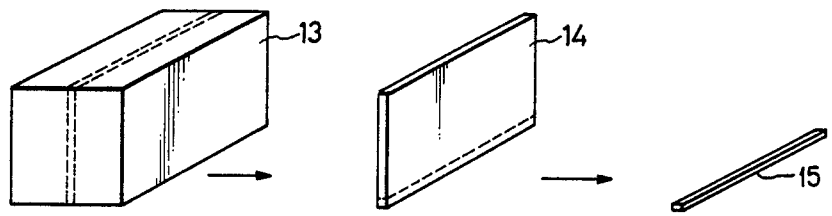
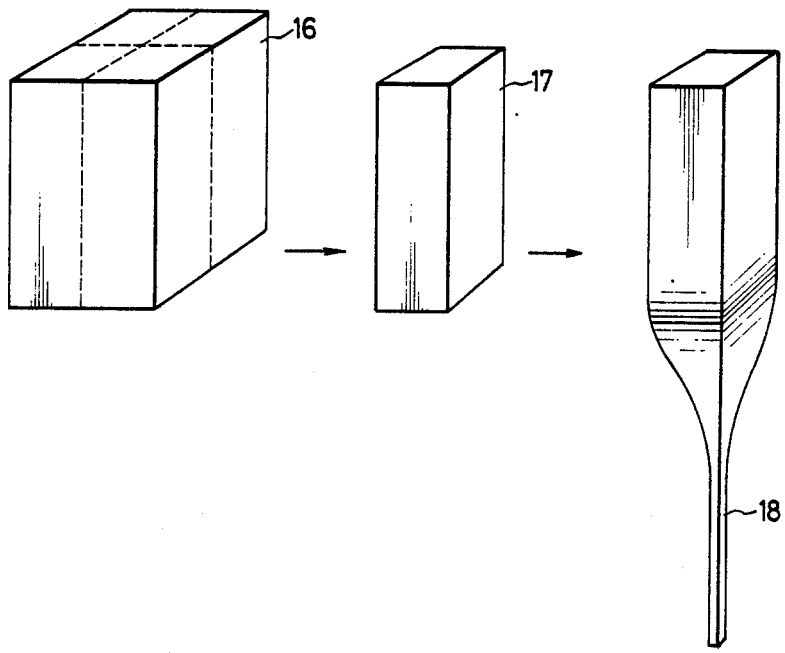

METHOD OF MANUFACTURING GLASS FIBER

BACKGROUND OF THE INVENTION

The present invention relates to a method of manufacturing a glass fiber having a polygonal cross section.

Recently, a demand for glass parts has increased in accordance with the development of electronics, and various types of glass have been developed from the point of the view of shape as well as the composition and property. Typical shapes of such glass are of plate, powder, tube, capillary, disk, fiber, and the like. The present invention relates to a method of manufacturing a glass fiber.

A prior art method will be described hereinbelow, using a sealing glass for the application to a gap of a magnetic head as one example. FIG. 4 shows a representative manufacturing process of a magnetic head for a video tape recorder.

In FIG. 4, a material of a tip for the magnetic head is cut from a ferrite ingot in step 20, and such a surface of the material is ground so as to make a bar suitable in size in step 21. Next, grooves for placing reinforcing glass are made by a track processing in step 22, and glass is molded into the grooves in step 23. Then, the excessive glass is ground, and the surface is polished with a groove for a coil being made in step 24. Thereafter glass for gaps is sputtered, two bars are adhered to each other, and gaps are formed in step 25. Then, the adhered bar is cut to make tips in step 26, and the sides of the tip are polished to make a tip having a suitable size in step 27. Next, the tip is adhered to a base in step 28, a tape travelling surface is polished in step 29, and the head is completed with unshown wire being wound in step 30.

In the above-mentioned glass mold process of step 23, generally, a fiber glass is used as the mold glass. Moreover, recently, a fiber having a quadrangular cross section is more used than a fiber having an orbicular cross section. This is because in the case of the orbicular fiber, a back grooved section 10 must be provided at the opposite side of the grooves by the track processing of a ferrite bar 9, and a jig 11 for giving inclination must be used in order to prevent the fiber 7 from falling down as shown in FIG. 5. Therefore, in the case of the quadrangular fiber, it is unnecessary to consider the above-mentioned two matters as shown in FIG. 6. Numeral 12 denotes a simple base. Although the fiber shown in FIG. 6 has a quadrangular cross section, a fiber having a triangular cross section may also be used.

There are two conventional and representative methods by which a polygonal glass fiber such as triangular or quadrangular glass fiber is formed. One of them is a method that the block of glass 13 (FIG. 7) is cut by a diamond saw and the like so as to make a plate 14 and a fiber 15 having a desirable size (FIG. 7). However, in this cutting method, there are problems which will be described hereinbelow. When cutting the glass block, it is necessary to pour water to the cutting portions in order that the cutting portions are cooled and the cut powders are cleared away. At this time, the water reacts with the glass because heat generated during cutting is large and the temperature arises. As a result, the glass in the vicinity of the cutting portions is liable to change in quality. Moreover, it is difficult to make a flat surface due to chatter vibrations on glass cutting. Therefore, the resulting surface has unevenness so that the surface of the glass is rough and the glass is cloudy. When the mold process of step 23 is carried out using this fiber, the air existing in the concave portions of the unevenness of the surface is enclosed into the glass so that the air remains in the glass as bubbles. The glass having bubbles causes producing and reproducing efficiency to attenuate at the head, leads to the flaw of a tape, and causes the tip to crack.

The other method is that first, the glass block 16 (FIG. 8) is cut to obtain a small block 17 whose thickness is about ten times larger than a desired thickness (FIG. 8), next the small block 17 is heated, and drawn to make a fiber 18 having a desired thickness 18 (FIG. 8). However, even in this method, it is indispensable to cut the glass block in order to make a small block. Therefore, the glass in the vicinity of the cutting portions inevitably changes in quality. As a result, when the glass mold process of step 23 is carried out using the drawn fiber, bubbles remain in the glass so that the above-mentioned problems arise as well.

Considering the above-mentioned conventional examples, it is necessary to remove the cutting process and moreover it is desirable that the surface of the resulting fiber is transparent and smooth when making a fiber having an angular cross section.

SUMMARY OF THE INVENTION

The present invention has been developed in order to remove the above-mentioned drawbacks inherent to the conventional polygonal fiber.

An object of the present invention is to provide a method of manufacturing a transparent glass fiber having a polygonal cross section whose surface is smooth.

Another object of the present invention is to provide a method of manufacturing a glass fiber having a polygonal cross section which has a uniform strength and an improved quality, and by which the yield of products is improved.

A further object of the present invention is to provide a method of manufacturing a glass fiber having a polygonal cross section which is suitable for a magnetic head and the glass fiber does not attenuate the producing and reproducing efficiencies at the magnetic head.

In accordance with the present invention there is provided a method of manufacturing a glass fiber comprising: pouring melted glass into a polygonal slit defined by two halves of a dividable mold; forming a preform having a thickness 5 to 20 times larger than a finally required thickness of a glass fiber to be made; drawing the preform with the preform being heated to a temperature of 100° to 150° C. higher than a softening point of the glass; and cooling glass drawn in the drawing step. Moreover, in accordance with the present invention there is provided a method of manufacturing a glass fiber comprising: pulling up a glass fiber having an orbicular cross section from glass melted at a temperature of 100° to 150° C. higher than a softening point; and forming a polygonal glass fiber with the orbicular fiber being passed through a polygonal slit formed by a twin roller which is heated higher than a softening point of the glass.

The slit is formed by making a V-shaped groove at the twin roller, and it is desirable that the processing accuracy of the V-shaped groove is such that a center line average height or roughness is less than 1.6 μm.

BRIEF DESCRIPTION OF THE DRAWINGS

The present invention will be described in further detail with reference to the accompanying drawings, in which:

FIGS. 7 and 8 are schematic diagrams showing conventional methods of manufacturing a polygonal glass fiber.

DETAILED DESCRIPTION OF THE INVENTION

The embodiments of the present invention are divided into two groups.

Figure 1:
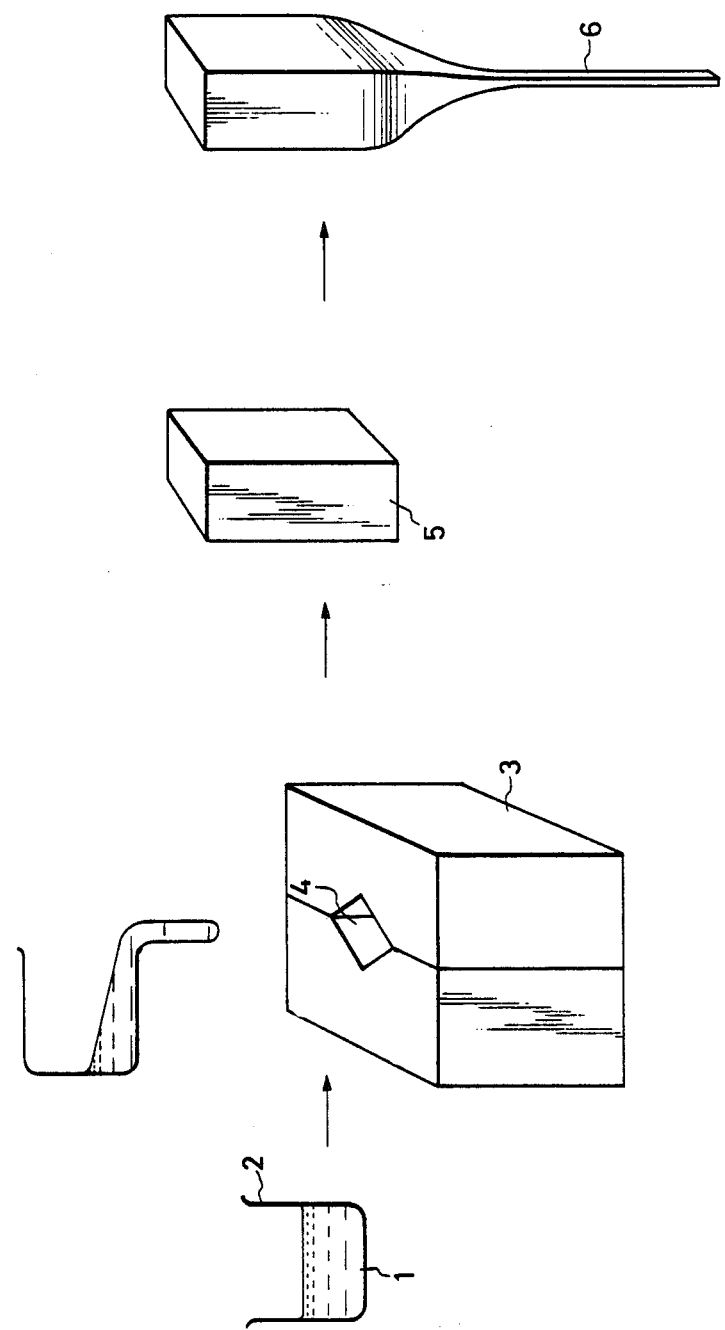
FIG. 1 is a schematic diagram showing a method of manufacturing a polygonal glass fiber according to an embodiment of the present invention.

Referring now to FIG. 1, one of embodiments of the present invention will be described hereinbelow. In FIG. 1, glass 1 is melted in a crucible 2, and at this time, the crucible 2 is heated by an unshown electric furnace or the like. The melted glass 1 is poured into a polygonal slit 4 provided at two halves of a two-dividable metallic mold 3, and then, the melted glass 1 is allowed to cool. In this way, a preform 5 is obtained. Although FIG. 1 shows a quadrangular slit 4 as an example, a triangular preform 5 can be obtained when one of two halves comprising the metallic mold 3 does not have a V-shaped groove. Thereafter, the preform 5 is taken out with the metallic mold 3 being divided, and then the preform 5 is heated and is drawn so that a polygonal fiber 6 having a desired thickness can be obtained.

EXAMPLE-1

Glass 1 having a softening point of 400° C. is put into the crucible 2. The glass is composed of 4% silicon dioxide ($SiO_2$), 13% boron trioxide ($B_2O_3$), 80% lead oxide (PbO), 1% Zinc oxide (ZnO), and 2% alumina ($Al_2O_3$) by weight. The glass 1 is heated to 900° C., and then, poured into the metallic mold 3 made of stainless steel having a quadrangular slit 4 whose cross section is of 10 mm×10 mm and whose depth is 100 mm. Thereafter, the glass 1 glass is allowed to cool. The resulting preform 5 is taken out of the metallic mold 3, is heated to a temperature of 500° to 520° C., and a fiber 6 having a cross section of 1 mm×1 mm is obtained with the tip end of the preforms being drawn. The resulting fiber has a smooth surface and is transparent.

Figure 4:
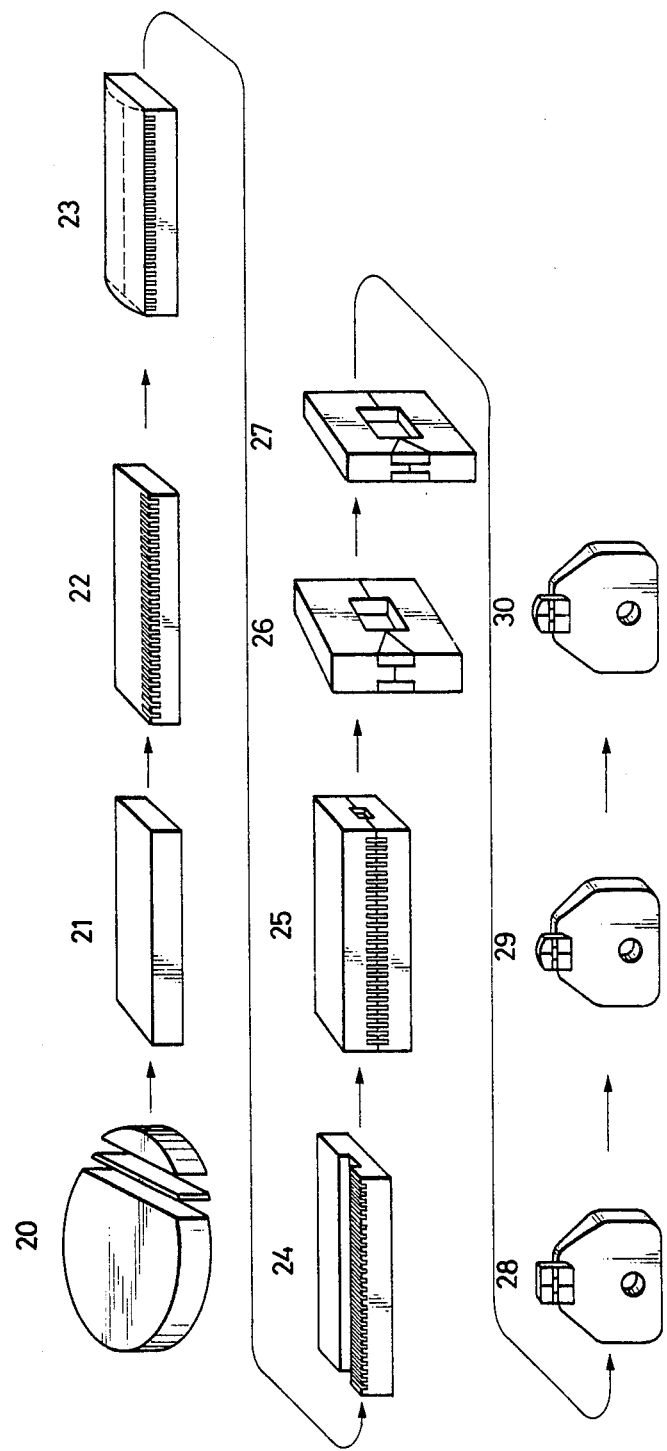
FIG. 4 is a manufacturing process view of a magnetic head in which a glass fiber is used as one member, useful for understanding the difference between the prior art and the present invention.
Figure 5:
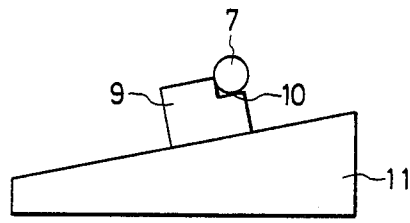
FIG. 5 is a view showing a conventional mold process, in which an orbicular glass fiber is used in a corresponding mold process shown in FIG. 4.
Figure 6:
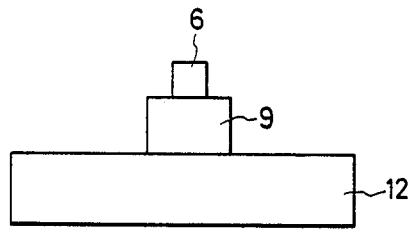
FIG. 6 is a view showing a conventional mold process, in which a polygonal glass fiber is used in a corresponding mold process shown in FIG. 4.

In the mold process of step 23 (FIG. 4), the obtained fiber is used, and the conditions of this process are as follows: the temperature is 480° C. and the time is 30 min. After the process of step 23, there is no bubble in the glass. As a result, the yield is 85% or above in the cutting process for getting tips in step 26 (FIG. 4). Moreover, even when the preform 5 having a cross section of 5 mm×5 mm or 20 mm×20 is used, the formation of the fiber can be carried out as well.

Considering the shape of the metallic mold 3, when the melted glass 1 is poured into a metallic mold which is simply provided with a polygonal opening and is not divided into two portions, the glass cannot be able to be taken out of the opening to obtain a preform. the fiber will be described hereinbelow. First, the glass is melted in a crucible at a temperature of 900° C., and then the melted glass is poured into a metallic mold made of stainless steel. Thus, a block 13 having a thickness of 20 mm, a width of 20 mm, and a length of 25 mm is made. After the adhesion and the fixation of the block 13 to an alumina plate are carried out, the block 13 is cut by a diamond saw to make a plate 14 having a thickness of 1 mm, a width of 20 mm, and a length of 25 mm. Thereafter, the adhesion and the fixation of the resulting plate 14 to another alumina plate are carried out, and the plate 14 is cut. Thus, a fiber 15 having a cross section of 1 mm×1 mm and a length of 25 mm is obtained. At this time, the diamond saw is moved at a speed of 15 mm/min., and water is used as a coolant.

For investigating the change in quality of the glass at the surface, the fiber surfaces of this comparative example and the example-1 are analyzed by ESCA method. Based on the intensity of the peak at $4f(7/2)$ caused by lead (Pb), and the intensity of the peak at $2p$ caused by silicon (Si), the ratio of Pb/Si is examined. The ratio in the fiber of this comparative example is 2 whereas the ratio in the fiber of the example-1 is 10. From this result, in the case of the surface of the fiber of this comparative example using water when cutting, lead (Pb) in the glass is eluted so that the amount of the lead (Pb) is one-fifth in comparison with that of the example-1.

Moreover, when the mold process of step 23 (FIG. 4) is carried out using the fiber obtained by this comparative example, numerous bubbles remain in the glass. As a result, in the cutting process of step 26 for making tips (FIG. 4), approximately 70% of entire tips are broken.

(Comparative example-2)

Using the glass used in the example-1 of the present invention, a polygonal fiber is obtained by the conventional method shown in FIG. 8. The process of making the fiber will be described hereinbelow. The block 16 is nearly the same as that of the comparative example-1, and this block is cut by the diamond saw so that a block 17 having a thickness of 10 mm, a width of 10 mm, a length of 100 mm is obtained. The cutting condition is the same as that of the comparative example-1, and water is used as a coolant. The block 17 is heated in the electric furnace to a temperature of about 500° C., and a fiber 18 having a cross section of 1 mm×1 mm is obtained with the preform being drawn.

When the fiber surface is analyzed by the ESCA method as well as the comparative example-1, the ratio of Pb/Si is 2. Therefore, it is obvious that the surface changes in quality. Moreover, numerous bubbles remain in the glass after the mold process of step 23 (FIG. 4). As a result, approximately 70% of entire tips are broken in the cutting process for making tips in step 26 (FIG. 4).

EXAMPLE-2

Glass 2 having a softening point of 570° C. is put into the crucible 2. The glass is composed of 35.4% silicon dioxide ($SiO_2$) 50.7% lead oxide (PbO), 4.8% Zinc oxide (ZnO), 4.8% sodium monoxide ($Na_2O$), 3.8% potassium monoxide ($K_2O$), and 0.5% arsenic trioxide ($As_2O_3$) by weight. The glass 1 is heated to 1400° C., and a preform 5 is heated to 700° to 720° C. The other conditions of the fiber formation are the same as that of the example-1 except the above-mentioned conditions.

The mold process of step 23 (FIG. 4) is carried out using the resulting fiber 6, and the condition of this process of step 23 is that the temperature is 750° C. and the time is 30 min. There is no bubble in the glass after this process of step 23. As a result, the yield is 90% or above in the cutting process of step 26 for making tips (FIG. 4). However, when the heating temperature of the preform 5 is set out of the above-mentioned range, the fiber formation is not carried out well, or the cross section of the fiber becomes orbicular.

(Comparative example-3)

Using the glass 2 used in the example-2 of the present invention, a fiber 15 is obtained by the method of the comparative example-1. When the mold process of step 23 (FIG. 4) is carried out using the resulting fiber 15, numerous bubbles remain in the glass. As a result, approximately 30% of entire tips are broken in the cutting process for making tips in step 26 (FIG. 4).

Figure 2A:
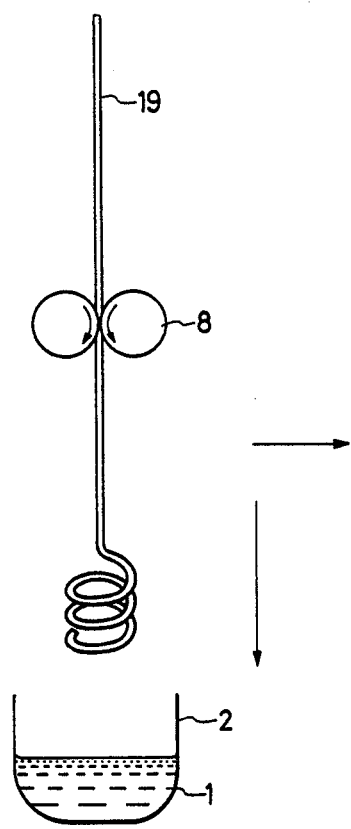
FIG. 2 is a schematic diagram showing a method of manufacturing a polygonal glass fiber according to another embodiment of the present invention.
Figure 2B:
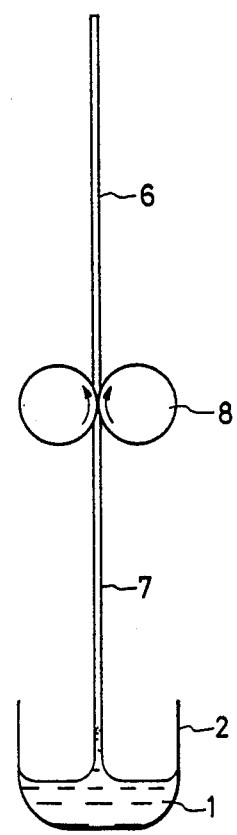
Figure 3:
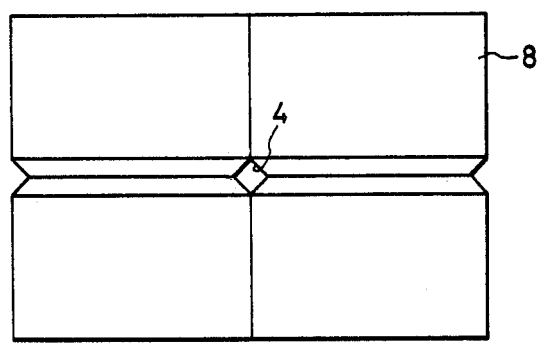
FIG. 3 is a top plan view of a twin roller shown in FIG. 2.

Referring now to FIG. 2, another embodiment of the present invention will be described hereinbelow. In FIG. 2, a glass 1 is melted in the crucible 2 with the crucible 2 being heated by the electric furnace. Glass 1 is an orbicular fiber 7 immediately after the glass 1 is drawn out of the crucible 2. Then, a polygonal fiber 6 is formed owing to the fact that the fiber 7 passes through a polygonal slit 4 (FIG. 3) formed by a heated twin roller 8 made of stainless steel. FIG. 3 is a top plan view of the twin roller 8, and the slit 4 is quadrangular in this embodiment. However, a triangular fiber can be obtained by using an unshown twin roller wherein one roller has a V-shaped groove, and the other roller has no V-shaped groove. Thus, the cross section of the resulting fiber can be formed freely.

EXAMPLE-3

Glass 1 having a softening point of 400° C. is put into the crucible 2. The glass 1 is composed of 4% silicon dioxide (SiO$_2$), 13% boron trioxide (B$_2$O$_3$), 80% lead oxide (PbO), 1% zinc oxide (ZnO), and 2% alumina (Al$_2$O$_3$) by weight. The glass 1 is heated to a temperature of 500° to 550° C., and is held melted. A platinum wire 19 having a spiral pointed end is immersed in the melted glass 1 (FIG. 2(a)), and then, the platinum wire is pulled up so that an orbicular fiber 7 having a diameter of about 1.5 to 2.0 mm is pulled up. The fiber is passed through a quadrangular slit 4, which has a cross section of 1 mm × 1 mm and is formed by the twin roller 8 heated to a temperature of 450° to 480° C. When the spiral end of the wire 19 passing through the twin roller 8, one roller of the twin roller 8 can be moved so as to pass the spiral end. Thus, a quadrangular fiber 6 having a cross section of 1 mm × 1 mm is obtained (FIG. 2(b)). With regard to the processing accuracy of the surface at the groove which forms the slit, a center line average height or roughness is less than 1.6 μm. The surface of the obtained fiber 6 is smooth, and the fiber 6 is transparent. The mold process of step 23 (FIG. 4) is carried out using the resulting fiber 6, and the condition of this process of step 23 is that the temperature is 480° C. and the time is 30 min. There is no bubble in the glass after this process of step 23. As a result, the yield is 85% or above in the cutting process for making tips in step 26 (FIG. 4).

When the temperature of the heated crucible 2 is lower than 500° C., the glass becomes hard so that the glass cannot be pulled up. On the other hand, when the temperature of the crucible 2 is higher than 550° C., the glass 1 becomes excessively soft, and the glass snaps when pulling up. Moreover, when the temperature of the twin roller 8 is lower than 450° C., it is difficult to transform the fiber from the orbicular shape to the quadrangular snape. On the other hand, when the temperature of the twin roller 8 is higher than 480° C., the glass adheres to the roller 8 so that the fiber formation cannot be carried out. Moreover, when the center line average height or roughness is more rough than 1.6 μm with regard to the processing accuracy of the V-shaped surface which forms the slit, the surface of the fiber has unevenness. As a result, bubbles occasionally remain in the glass after the mold process of step 23 (FIG. 4).

EXAMPLE-4

Glass 2 is used which is composed of 35.4% silicon dioxide (SiO$_2$), 50.7% lead oxide (PbO), 4.8% zinc oxide (ZnO), 4.8% sodium monoxide (Na$_2$O), 3.8% potassium monoxide (K$_2$O) and 0.5% arsenic trioxide (As$_2$O$_3$) by weight. The glass has a softening point of 570° C. The heating temperature of the crucible 2 is 670° to 720° C., and the heating temperature of the twin roller 8 is 630° to 670° C. The other conditions of the fiber formation are the same as that of the example-3 except for the above-mentioned conditions.

The mold process of step 23 (FIG. 4) is carried out using the resulting fiber, and the condition of this process of step 23 is that the temperature is 750° C. and the time is 30 min. There is no bubble in the glass after this process of step 23. As a result, the yield is 90% or above in the cutting process of step 26 for making tips. Moreover, when the heating temperatures of the crucible 2 and the roller 8 are respectively set out of the above-mentioned range, the quadrangular fiber cannot be obtained as well as the example-3.

EXAMPLE-5

Glass 3 having a softening point of 408° C. is used which is composed of 5.3% silicon dioxide, 8.4% boron trioxide (B$_2$O$_3$), 73.2% lead oxide (PbO), 2.5% zinc oxide (ZnO), 1.9% alumina (Al$_2$O$_3$), and 8.7% cadmium oxide (CdO) by weight. The other conditions of the fiber formation are the same as that of the example-1 except the above-mentioned composition of the used glass. Using the resulting fiber, the mold process of step 23 (FIG. 4) is carried out in the same manner as example-1. There is no bubble in the glass after this process of step 23. As a result, the yield is 85% or above in the cutting process of step 26 for making tips (FIG. 4).

EXAMPLE-6

Glass 3 having a softening point of 408° C. is used which is composed of 5.3% silicon dioxide, 8.4% boron trioxide (B$_2$O$_3$), 73.2% lead oxide (PbO), 2.5% zinc oxide (ZnO), 1.9% alumina (Al$_2$O$_3$), and 8.7% cadmium oxide (CdO) by weight. The other conditions of the fiber formation are the same as that of the example-3 except the above-mentioned composition of the used glass. Using the resulting fibar, the mold process of step 23 (FIG. 4) is carried out in the same manner as example-1. There is no bubble in the glass after this process of step 23. As a result, the yield is 85% or above in the cutting process of step 26 for making tips (FIG. 4).

EXAMPLE-7

Glass 4 having a softening point of 568° C. is used which is composed of 31.5% silicon dioxide (SiO$_2$), 3% boron trioxide (B$_2$O$_3$), 47% lead oxide (PbO), 4% cadmium oxide (CdO), 14% potassium monoxide (K$_2$O), and 0.5% arsenic trioxide ($As_2O_3$) by weight. The other conditions of the fiber formation are the same as that of the example-2 except for the above-mentioned composition of the used glass. Using the resulting fiber, the mold process of step 23 (FIG. 4) is carried out in the same manner as example-2. There is no bubble in the glass after this process of step 23. As a result, the yield is 90% or above in the cutting process of step 26 for making tips (FIG. 4).

EXAMPLE-8

Glass 4 having a softening point of 568° C. is used which is composed of 31.5% silicon dioxide ($SiO_2$), 3% boron trioxide ($B_2O_3$), 47% lead oxide (PbO), 4% cadmium oxide (CdO), 14% potassium monoxide ($K_2O$), and 0.5% arsenic trioxide ($As_2O_3$) by weight. The other conditions of the fiber formation are the same as that of the example-4 except the above-mentioned composition of the used glass. Using the resulting fiber, the mold process of step 23 (FIG. 4) is carried out in the same manner as example-2. There is no bubble in the glass after this process of step 23. As a result, the yield is 90% or above in the cutting process of step 26 for making tips (FIG. 4).

In the above-mentioned embodiments, detailed examples are described in which fibers are applied to the manufacturing of the magnetic head. However, it is a matter of course that the method of manufacturing the fiber according to the present invention can be applied to the manufacturing of fibers used for sealing various electric parts and optical fibers.

Moreover, the method of the present invention is not restricted to the formation of the triangular fiber or the quadrangular fiber. It is obvious that various polygonal fibers such as a trapezoidal fiber or a hexagonal fiber can be formed simply by changing the shape of the slit of the mold or the roller.

Glass compositions suitable for use in the present methods comprise 2 to 7% $SiO_2$, 4 to 13% $B_2O_3$, 70 to 85% PbO, 1 to 7% ZnO, 1 to 5% $Al_2O_3$, and 0 to 15% CdO, by weight. More specific compositions suitable for use in the present methods comprise 3.5 to 5.5% $SiO_2$, 8 to 9% $B_2O_3$, 73 to 75% PbO, 2 to 6.5% ZnO, 1 to 2.5% $Al_2O_3$, and 3 to 9% CdO, by weight. Other suitable compositions comprise 30 to 36% $SiO_2$, 0 to 5% $B_2O_3$, 29 to 51% PbO, 4 to 20% MO, 0 to 5% $Na_2O$, 3 to 16% $K_2O$, 0 to 5% RO, 0 to 5% $Al_2O_3$ and 0 to 0.5% $As_2O_3$ or $Sb_2O_3$, by weight, in which M is at least one of Zn and Cd and R is alkaline earth metal. In more specific compositions, the CdO and ZnO are included such that CdO/(ZnO+CdO) is greater than or equal to 0.5, by weight.

According to the method of manufacturing the fiber of the present invention, a fiber can be obtained which is transparent and whose surface is smooth and which has no change in quality as described above. Moreover, when the fiber is applied to the magnetic head or the like, there is no bubble in the glass and the yield of production can be improved.

Although certain preferred embodiments of the present invention have been shown and described in detail, it should be understood that various changes and modifications may be made without departing from the scope of the appended claims.

What is claimed is:

1. A method of manufacturing a glass fiber, comprising the steps of:
   (a) pouring melted glass into a slit defined by two halves of a dividable mold, the slit having a polygonal cross-sectional shape of a thickness 5 to 20 times larger than a finally required thickness of the glass fiber;
   (b) cooling the glass poured into the polygonal slit;
   (c) removing said dividable mold from said glass to obtain a preform having said polygonal cross-sectional shape;
   (d) drawing said preform with said preform being heated to a temperature 100° to 150° C. higher than a softening point of said glass so as to obtain a glass fiber having said polygonal cross-sectional shape; and
   (e) cooling said glass fiber having said polygonal cross-sectional shape.

2. A method of manufacturing a glass fiber as claimed in claim 1, wherein said glass is composed of 2 to 7% $SiO_2$, 4 to 13% $B_2O_3$, 70 to 85% PbO, 1 to 7% ZnO, 1 to 5% $Al_2O_3$, and 0 to 15% CdO, by weight, and said glass is melted and poured into said polygonal slit.

3. A method of manufacturing a glass fiber as claimed in claim 2, wherein said glass is heated to be melted to 900° C., and the preform formed by pouring into said polygonal slit is drawn under a heated state of 500° to 520° C.

4. A method of manufacturing a glass fiber as claimed in claim 1, wherein said glass is composed of 30 to 36% $SiO_2$, 0 to 5% $B_2O_3$, 29 to 51% PbO, 4 to 20% MO, 0 to 5% $Na_2O$, 3 to 16% $K_2O$, 0 to 5% RO, 0 to 5% $Al_2O_3$, and 0 to 0.5% $As_2O_3$ or $Sb_2O_3$, by weight in which said M is at least one of Zn and Cd and said R is alkaline earth metal, and said glass is poured into said polygonal slit with said glass being heated to be melted.

5. A method of manufacturing a glass fiber as claimed in claim 4, wherein said glass is melted at 1400° C., and the preform formed by pouring into said polygonal slit is heated to a temperature of 700° to 720° C. and is drawn.

6. A method of manufacturing a glass fiber as claimed in claim 3, wherein said glass is composed of 3.5 to 5.5% $SiO_2$, 8 to 9% $B_2O_3$, 73 to 75% PbO, 2 to 6.5% ZnO, 1 to 2.5% $Al_2O_3$, and 3 to 9% CdO by weight.

7. A method of manufacturing a glass fiber as claimed in claim 3, wherein said glass is composed of 4% $SiO_2$, 13% $B_2O_3$, 80% , PbO, 1% ZnO, and 2% $Al_2O_3$ by weight.

8. A method of manufacturing a glass fiber as claimed in claim 5, wherein said glass comprises CdO and ZnO and wherein Cd/O(ZnO+CdO)=0.5, by weight.

9. A method of manufacturing a glass fiber as claimed in claim 5, wherein said glass is composed of 35.4% $SiO_2$, 50.7% PbO, 4.8% ZnO, 4.8% $Na_2O$, 3.8% $K_2O$, and 0.5% $As_2O_3$, by weight.

10. A method of manufacturing a glass fiber as claimed in claim 1, wherein the preform has a cross-section not greater than 20 mm×20 mm and not less than 5 mm×5 mm.

* * * * *